Oct. 5, 1954     K. C. BOTTENBERG     2,690,989
METHOD OF PREVENTING HYDROGEN SULFIDE HYDRATE FORMATION
Filed Oct. 1, 1951
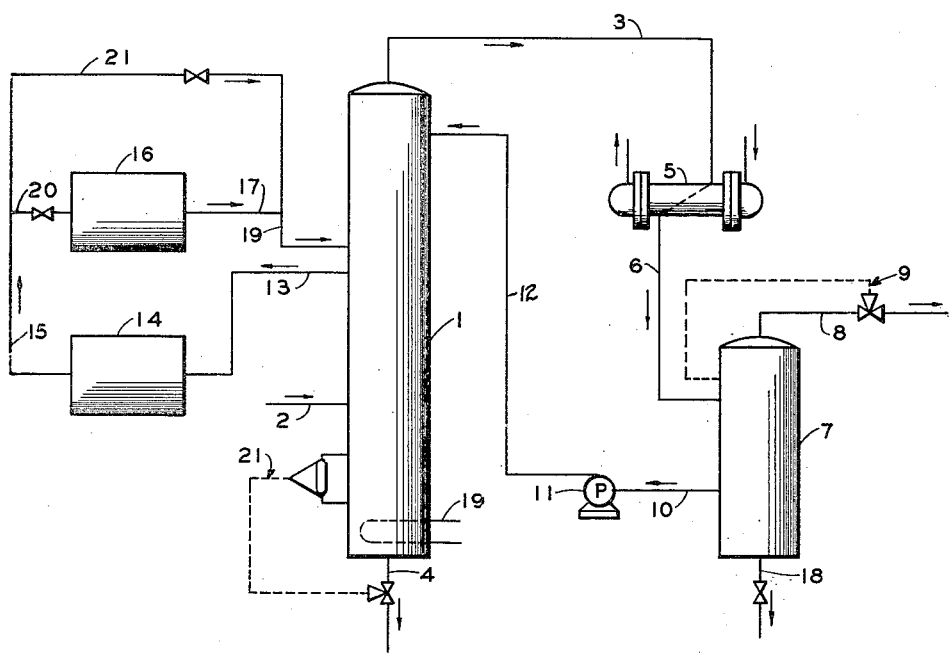
INVENTOR.
K.C. BOTTENBERG
BY
ATTORNEYS

UNITED STATES PATENT OFFICE 2,690,989

METHOD OF PREVENTING HYDROGEN SULFIDE HYDRATE FORMATION

Kenneth C. Bottenberg, Bartlesville, Okla., assignor to Phillips Petroleum Company, a corporation of Delaware Application October 1, 1951, Serial No. 249,018

16 Claims. (Cl. 196—4)

This invention relates to the treatment of light hydrocarbon for the removal of undesirable components. In one aspect it relates to a deethanizing operation in which moist stock being deethanized contains hydrogen sulfide. In another aspect it relates to a method for the separation of this hydrogen sulfide in such a deethanization operation to eliminate tendencies toward the formation of hydrogen sulfide hydrate.

The volatility of hydrogen sulfide is such that it falls between propane and ethane. In deethanization by fractional distillation conventional practice is to take part of the propane overhead in order to have sufficient reflux liquid for cooling the top of the fractionator. Consequently substantially all of the hydrogen sulfide will also be taken overhead. Otherwise it would be necessary to operate the fractionator at a sufficiently high pressure and low enough temperature to liquefy an overhead ethane product for production of reflux.

In the usual type of deethanization operation the concentration of the hydrogen sulfide reaches its greatest value in the fractionating tower at about two-thirds to three-fourths the way up the column. Ordinarily hydrocarbon stocks contain at least some dissolved water. In a fractionation operation this dissolved water also concentrates in the upper section of the tower. In the presence of water and under the temperature and pressure conditions normally prevailing in deethanization operation there is a decided tendency for the hydrogen sulfide to form hydrates. These hydrates are solid or semisolid crystals which tend to plug the fractionator or the overhead lines and coolers. In many instances the fractionator upper trays, overhead lines and coolers become more or less plugged with this hydrate. The result is that the fractionator has to be shut down at more or less frequent intervals depending upon the hydrogen sulfide and moisture contents of the charge stock to permit melting and removal of the hydrates before proper operations can be resumed.

As mentioned above nearly all hydrocarbon stocks contain at least small quantities of dissolved water. The solubility of water in liquid hydrocarbons is of the order of .01 to .04 per cent water. Even though this amount of water is very small yet when concentrated in the upper sections of a fractionator the concentration at localized points is considerable. The fact that the hydrogen sulfide and water occur in the greatest concentrations at the same point in a deethanization tower frequently makes such operations troublesome.

One object of this invention is to provide a process for the elimination of the tendency toward hydrogen sulfide hydrate formation in the upper portion of a deethanization tower.

Another object of this invention is to provide a process for the elimination of the tendency for hydrogen sulfide hydrate formation in deethanization tower overhead lines and coolers.

Still other objects and advantages of my invention will be realized by those skilled in the art upon reading the following disclosure which taken with the attached drawing forms a part of this specification.

The drawing illustrates one embodiment of apparatus in diagrammatic form for carrying out the process of my invention.

In this invention it is proposed to withdraw a side stream of hydrocarbon from the deethanization fractionator in the region of the highest hydrogen sulfide concentration, treating the withdrawn stream for hydrogen sulfide removal and returning the treated stream to the fractionator. The hydrogen sulfide can be removed from this hydrocarbon side stream by any suitable method. The treated stream is then returned to the fractionator at a point above or below its point of withdrawal. Preferably it is desired to return the stream to a point in the column above its point of withdrawal to reduce the tendency towards dilution of the hydrogen sulfide at the point of withdrawal. Removal of the hydrogen sulfide or a reduction of its concentration will greatly improve the deethanizing fractionator operation by eliminating or reducing the hydrate formation which eventually plugs the equipment thereby rendering it inoperative or greatly reducing its efficiency. Removal of the side stream from the fractionator gives the smallest volume stream for treatment for effective hydrogen sulfide removal. However the invention is operative if side streams are taken from other levels in the fractionator. However the volume of the side streams taken at other points will be greater than the volume needed to be taken at the point of greatest hydrogen sulfide concentration. Thus it is particularly advantageous to take the side stream from the point of greatest hydrogen sulfide concentration in order to minimize the size or capacity and accordingly the cost of construction and operation of the hydrogen sulfide removal apparatus.

Withdrawal of a side stream for a fractionating unit is usually for the purpose of obtaining a product of a desired boiling range as a product intermediate in properties between the overhead product and bottoms product. When side streams are withdrawn as product streams they are not returned to the fractionator. In this invention the side stream withdrawn is not for product purposes but is for an intermediate treatment after which it is returned to the fractionator for improving the operation thereof.

Referring now to the drawing reference numeral 1 refers to a conventional fractionating column provided with liquid-vapor contacting elements such as bubble cap trays. In about the center of the column vertically is a pipe 2 for introduction of feed stock into the column. An overhead line 3 is for removal of overhead vaporous material. A condenser 5 is for condensation of this overhead material while pipe 6 conveys the condensate therefrom to an accumulator vessel 7. An overhead pipe 8 connected with this accumulator vessel 7 is for removal of the vaporous or gaseous product. A back pressure regulator assembly 9 maintains a proper pressure upon the deethanization fractionator system. A line 4 is provided at the bottom of the fractionator for removal of bottoms product. A liquid level controlling device 21 provides means for maintaining a desired constant level of bottoms material in the fractionator. This controller apparatus 21 is connected operatively with a valve in line 4 for control of the withdrawal of the bottoms product. A line 10 connects the accumulator vessel 7 with a pump 11, which pump transfers liquid from the accumulator on through a pipe 12 as reflux liquid for the column 1. A line 18 is provided in the bottom of the accumulator for removal of bottoms material.

The fractionator 1 is provided with side pipe connections 13 and 19. Line 13 is provided for the withdrawal of a side stream material from the fractionator for passage into a hydrogen sulfide removal unit 14. A conduit 15 connects this treating element 14 with a conduit 21 which in turn is connected with the pipe 19 for return of liquid material from element 14 to a point in the fractionator above its point of withdrawal. Element 16 is connected with line 15 via line 20 in case material flowing through line 15 is to receive a treatment subsequent to the treatment in vessel 14. Material treated in element 16 is passed through a line 17 for reentry into the fractionator 1 by way of line 19.

The hydrogen sulfide removing element 14 may be a conventional caustic washing apparatus in which such a reagent as caustic soda is used for absorption of hydrogen sulfide from the hydrocarbon stream. When a caustic washing apparatus is used it is preferable to dry the caustic washed hydrocarbon stream from its moisture content by passage through line 20 into a drying apparatus 16. This appaartus may be such a drying apparatus as one containing such a desiccant as bauxite or silica gel.

In case it is desired to use such a hydrogen sulfide removal apparatus or system as an amine treater this same desiccant element 16 may need to be employed. However the amine treater in addition to being charged with a hydrogen sulfide absorbing amine solution may also contain such a liquid desiccant material as ethylene glycol. When these two reagents are used together in a hydrogen sulfide removal operation moisture from a hydrocarbon stream is also removed and a relatively dry hydrocarbon product is produced. In this case the dehydrating element 16 need not be used and the valve in line 20 may be closed and the valve in line 21 opened so that the dry hydrocarbon stream may flow from line 15 through lines 21 and 19 directly into the fractionator.

The operation of a simple amine treater or a dehydrating amine treater and a solid desiccant dehydrating apparatus are all well known to those skilled in the hydrocarbon treating art and for purposes of simplicity and brevity the operations of these elements will not be detailed.

In the operation of the process of my invention a hydrocarbon charge stock containing hydrogen sulfide as an impurity and some dissolved moisture is charged into the fractionator 1 through the charge line 2 from a source, not shown. This fractionator 1 is operated under conventional deethanizing operating conditions by the furnishing of reboiling heat from a reboiler coil 19 and the furnishing of liquid reflux from line 12. A side stream consisting largely of ethane but containing some propane and a maximum concentration of hydrogen sulfide and moisture is removed through line 13 and passed into the hydrogen sulfide removal element 14. In this element the hydrogen sulfide is removed by some method, such as one mentioned hereinbefore. The hydrogen sulfide-free stream is then passed from treater 14 back into the fractionator either through the by-pass line 21 or through the dehydrating system 16. In this manner the constituents of hydrogen sulfide-hydrate are not present in the upper trays of a fractionator and accordingly this solid hydrate is not formed in this region.

The range of operating temperatures and pressures for the deethanization operation is from about 50° to 160° F. in the top of the fractionator with a pressure of from 250 to 400 pounds per sq. in. It is impractical to vary operating conditions of a deethanization fractionator to such an extent that hydrogen sulfide-hydrate will not form in the upper trays without entirely and completely upsetting efficiency of operation. It is possible however to alter the operating conditions somewhat to avoid formation of for example ethane-hydrate or propane-hydrate in the overhead vapor lines without altering the efficiency of the column to any great extent. It is not absolutely essential to remove all of the moisture of the stream freed from its hydrogen sulfide content. However it is preferable to dehydrate this stream to such an extent that operation of the deethanization column need not be altered to the point of decreasing the fractionating efficiency thereof.

It is frequently not absolutely necessary to remove all of the hydrogen sulfide content but is preferable to do so.

My invention is applicable to other than deethanization operations wherein hydrogen sulfide and water are present. However it will apply predominately to deethanization. In normal processing of hydrocarbons by fractional distillation it is best operation to remove the hydrogen sulfide or reduce its concentration appreciably before subjecting the stock to deethanization or depropanizing operations and under such conditions the practice of my invention may not be necessary. However under the particular conditions in which there is appreciable hydrogen sulfide (and moisture) content in the stream introduced into a deethanization operation then my invention has particular application.

Most valves, pumps, gauges, flow and pressure controllers and the like are not shown in the drawing nor mentioned in the specification for purposes of simplicity. However the need for the use of such auxiliary apparatus, its installation and operation are well understood by those skilled in the art.

Hydrogen sulfide containing stocks are frequently corrosive and if the stock treated according to my invention possesses corrosive properties, corrosive resistant apparatus may need to be used in the apparatus parts where corrosion may occur. When the stock does not exhibit corrosive properties, the materials of construction may be selected from less costly materials.

While certain embodiments of the invention have been described for illustrative purposes, the invention obviously is not limited thereto.

I claim:

1. In a fractionation process for the removal of ethane and lower boiling hydrocarbons from a hydrocarbon mixture containing these, higher boiling hydrocarbons, hydrogen sulfide and moisture, the steps comprising introducing said hydrocarbon mixture into a deethanizing zone at such a point as to provide a stripping zone below and a fractionation zone above the point of feed introduction, subjecting said mixture to fractionation conditions, removing from this operation an overhead product comprising ethane and said lower boiling hydrocarbons and a bottoms product comprising propane and said higher boiling hydrocarbons, withdrawing at least a portion of the partially fractionated material from said fractionation zone, treating the withdrawn material for removal of hydrogen sulfide, reintroducing this treated material into said fractionation zone at a point above its point of withdrawal and recovering from said overhead product a further product free from hydrogen sulfide whereby hydrogen sulfide-hydrate formation in that portion of said fractionation zone above the point of withdrawal of said portion of partially fractionated material is prevented.

2. A process for eliminating the hydrogen sulfide hydrate formation tendencies exhibited in the deethanization of a hydrocarbon stock containing at least ethane, propane, hydrogen sulfide and moisture comprising the steps of introducing said hydrocarbon stock into a deethanizing zone at such a point as to provide a stripping zone below and a fractionation zone above the point of feed introduction, subjecting said hydrocarbon stock to deethanizing conditions, removing bottoms product as one product of the process, withdrawing a minimum volume of the partially fractionated material from said fractionation zone, treating this withdrawn material for removal of hydrogen sulfide, reintroducing this so treated material into said fractionation zone at a point higher in said zone than its point of withdrawal, said minimum volume of partially fractionated material withdrawn being at least that required to eliminate hydrogen sulfide-hydrate formation in that portion of said fractionation zone above its point of withdrawal and removing an overhead product comprising ethane free from hydrogen sulfide-hydrate forming tendencies as a second product of the process.

3. The process of claim 2 wherein the point of withdrawal of said partially fractionated material is the point of maximum hydrogen sulfide content.

4. In the process according to claim 3, treating said withdrawn material for hydrogen sulfide removal by a caustic soda washing operation.

5. In the process according to claim 3, treating said withdrawn material for hydrogen sulfide removal by a caustic washing operation and drying the washed material prior to reintroducing same into the fractionation zone.

6. In the process according to claim 3, treating said withdrawn material for hydrogen sulfide removal in an acidic gas-amine washing operation.

7. In the process according to claim 3, treating said withdrawn material for hydrogen sulfide removal in an acidic gas-amine washing operation, and drying the washed material prior to reintroduction into the fractionation zone.

8. In the process according to claim 3, treating said withdrawn material for hydrogen sulfide and moisture removal in an acidic gas-amine washing operation wherein said amine contains a dehydrating agent.

9. The process according to claim 5 wherein the drying operation comprises passing the moisture containing material over a solid desiccant.

10. A process for eliminating the hydrogen sulfide-hydrate formation tendencies exhibited in the deethanization of a moist hydrocarbon stock containing at least ethane and propane, and hydrogen sulfide, comprising the steps of introducing said hydrocarbon stock into a deethanizing zone at such a point as to provide a stripping zone below and a fractionating zone above the point of feed introduction, maintaining the temperature of the top of said fractionation zone between the limits of 50° and 160° F. at a pressure within the deethanizng zone from 250 to 400 pounds per square inch gage by adding reboil heat to the last stated zone and reflux to the top thereof, removing bottoms product as one product of the process, withdrawing a minimum volume of the partially fractionated material from the fractionating zone at the point of maximum hydrogen sulfide content, removing hydrogen sulfide from this withdrawn material, reintroducing the so treated material into the fractionating zone at a point above its point of withdrawal, said minimum volume of partially fractionated material withdrawn being at least that required to eliminate hydrogen sulfide-hydrate formation in that portion of said fractionation zone above its point of withdrawal and removing an overhead product comprising ethane free from hydrogen sulfide-hydrate formation tendencies as a second product of the process.

11. In the process according to claim 10, treating said withdrawn material for hydrogen sulfide removal by a caustic soda washing operation.

12. In the process according to claim 10, treating said withdrawn material for hydrogen sulfide removal by a caustic washing operation and drying the washed material prior to reintroducing same into the fractionation zone.

13. The process according to claim 12 wherein the drying operation comprises passing the moisture containing material over a solid desiccant.

14. In the process according to claim 10, treating said withdrawn material for hydrogen sulfide removal in an acidic gas-amine washing operation.

15. In the process according to claim 10, treating said withdrawn material for hydrogen sulfide removal in an acidic gas-amine washing operation, and drying the washed material prior to reintroduction into the fractionation zone.

16. In the process according to claim 10, treating said withdrawn material for hydrogen sulfide and moisture removal in an acidic gas-amine washing operation wherein said amine contains a dehydrating agent.

References Cited in the file of this patent

UNITED STATES PATENTS

| Number | Name | Date |
|---|---|---|
| 1,924,855 | Heid | Aug. 29, 1933 |
| 2,309,653 | Leum | Feb. 2, 1943 |
| 2,399,837 | Upham | May 7, 1946 |
| 2,410,233 | Legatski | Oct. 29, 1946 |
| 2,571,329 | Berg | Oct. 16, 1951 |